United States Patent [19]

Maekawa et al.

[11] 4,264,089
[45] Apr. 28, 1981

[54] SEAT BELT MECHANISM

[75] Inventors: Naozane Maekawa, Toyokawa; Takeshi Awano, Okazaki, both of Japan

[73] Assignee: Mitsubishi Jidosha Kogyo Kabushiki Kaisha, Tokyo, Japan

[21] Appl. No.: 10,383

[22] Filed: Feb. 8, 1979

[30] Foreign Application Priority Data

| Feb. 16, 1978 | [JP] | Japan | 18732[U] |
| Mar. 6, 1978 | [JP] | Japan | 28826[U] |
| Mar. 31, 1978 | [JP] | Japan | 40883[U] |
| Jun. 14, 1978 | [JP] | Japan | 81968[U] |
| Jun. 27, 1978 | [JP] | Japan | 88714[U] |
| Sep. 1, 1978 | [JP] | Japan | 120132[U] |

[51] Int. Cl.³ ............................................. B60R 21/02
[52] U.S. Cl. ......................... 280/803; 280/807; 280/808
[58] Field of Search ............... 280/802, 803, 804, 806, 280/807, 808; 297/469, 474, 475, 476, 477, 478, 481, 482, 483, 485

[56] References Cited

U.S. PATENT DOCUMENTS

| 3,608,963 | 9/1971 | Steere | 297/482 |
| 3,842,929 | 10/1974 | Wada et al. | 280/804 |
| 3,993,328 | 11/1976 | Henderson | 280/807 |
| 4,039,224 | 8/1977 | Bauer | 297/469 |
| 4,040,645 | 8/1977 | Giffen | 280/803 |
| 4,053,175 | 10/1977 | Kato et al. | 280/803 |
| 4,116,402 | 9/1978 | Nomura et al. | 280/806 |
| 4,138,142 | 2/1979 | Wize | 280/803 |

FOREIGN PATENT DOCUMENTS

| 2412766 | 9/1975 | Fed. Rep. of Germany | 280/801 |
| 1486974 | 9/1977 | United Kingdom | 297/473 |

Primary Examiner—John J. Love
Assistant Examiner—Randall A. Schrecengost
Attorney, Agent, or Firm—Oldham, Oldham, Hudak & Weber Co.

[57] ABSTRACT

A seat belt mechanism comprising a first through member attached to a sash of a door, a second through member supported in the door, a shoulder belt inserted through the first through member and a waist belt inserted through the second through member, respective one ends of the belts being reeled into a retractor, while respective other ends of the belts being held by a belt hold member fixed to a vehicle body or a seat. The second through member is moved upwardly and downwardly in a guide provided in the door by an actuator device depending on opening the closing of the door, so that a passenger can easily get into out of the vehicle without having unpleasant feelings.

47 Claims, 33 Drawing Figures

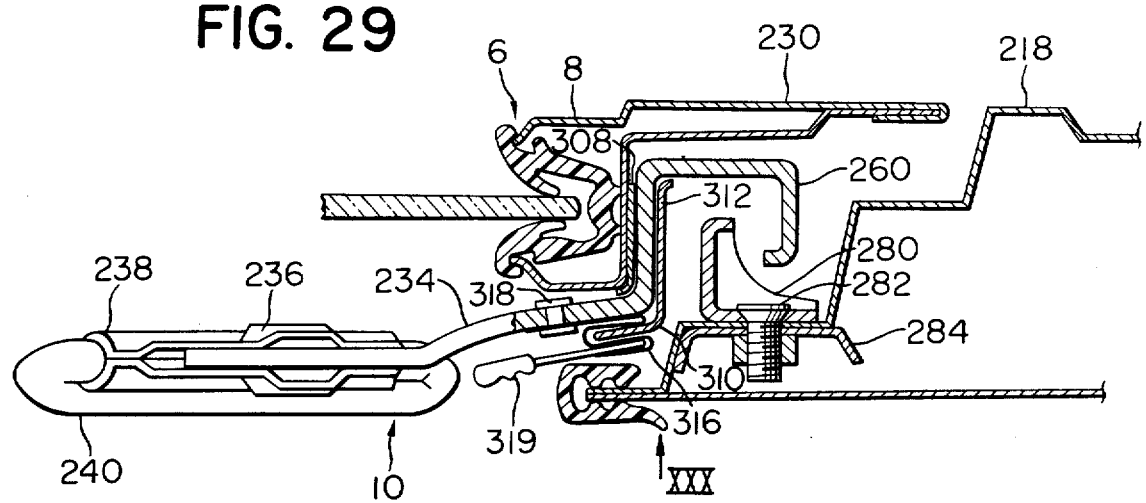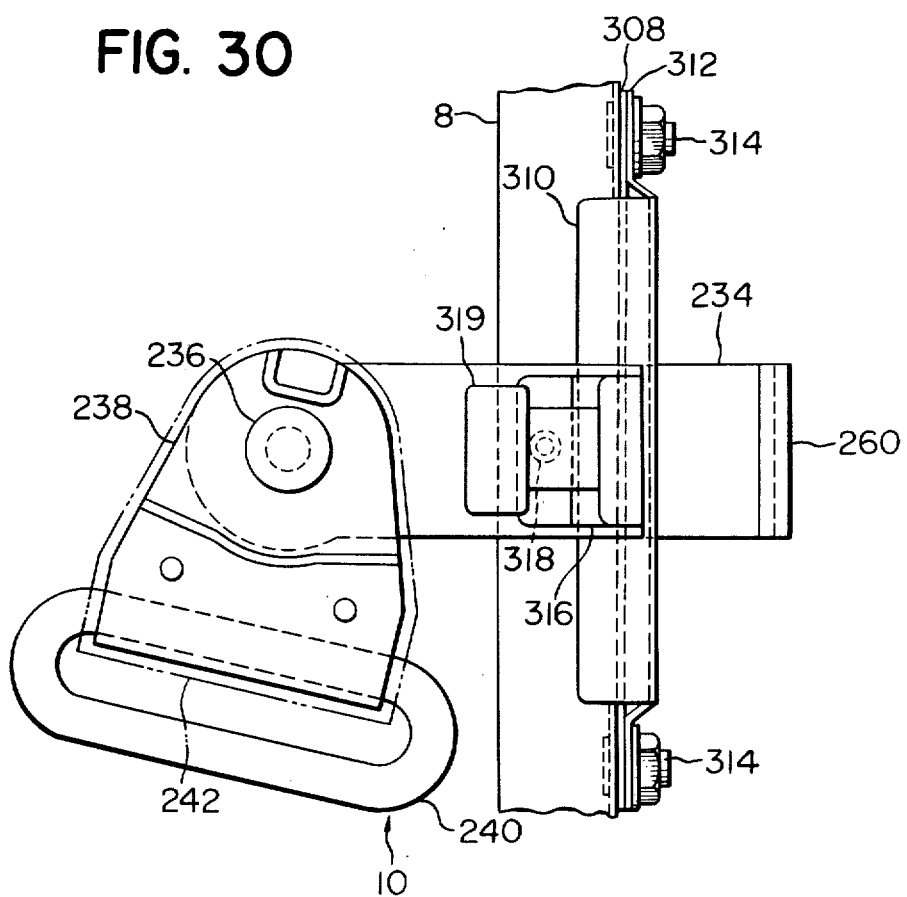

SEAT BELT MECHANISM

BACKGROUND OF THE INVENTION

This invention relates to an improvement of a seat belt mechanism.

Various kinds of seat belts have been utilized as one of the methods for protecting the passengers in the event of a collision of a vehicle. Recently, there has been developed a passive seat belt in which the seat belt is automatically moved into a restraining position and an unrestraining position with respect to the passenger depending on opening and closing of a door of the vehicle.

SUMMARY OF THE INVENTION

An object of this invention is to provide a seat belt mechanism in which the seat belt is automatically moved into the unrestraining position with respect to the passenger upon opening of the door for allowing the passenger to easily get into and out of the vehicle, and at this time unpleasant visual and tactile feelings sensed by the passenger due to the existence of the seat belt are greatly reduced. Also, when the door is closed, the seat belt is moved into the restraining position with respect to the passenger to positively restrain him.

BRIEF DESCRIPTION OF THE DRAWINGS

This invention will be explained by way of example with reference to the accompanying drawings in which:

FIG. 29 is a cross-sectional view similar to FIG. 18, the first through member being attached to the sash in a further different way, FIG. 30 is a view seeing along an arrow XXX in FIG. 29, the pillar being deleted.

DESCRIPTION OF THE PREFERRED EMBODIMENTS

Figure 1:
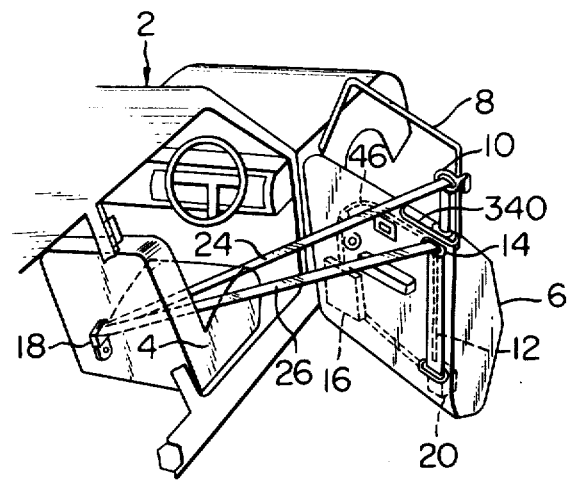
FIG. 1 is a schematic perspective view of a vehicle associated with a seat belt mechanism according to the invention.
Figure 2:
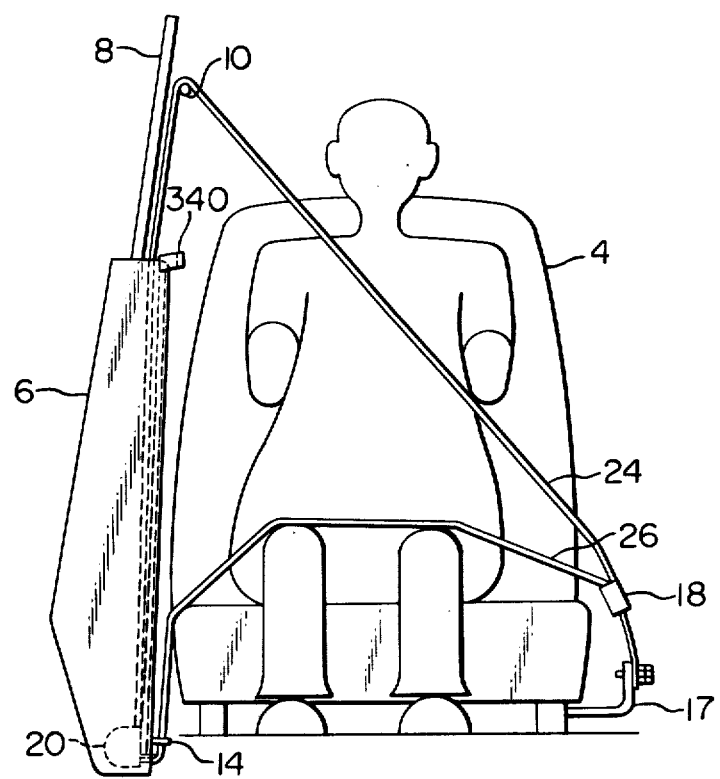
FIG. 2 is a schematic view showing a passenger with the seat belt fastened.
Figure 3:
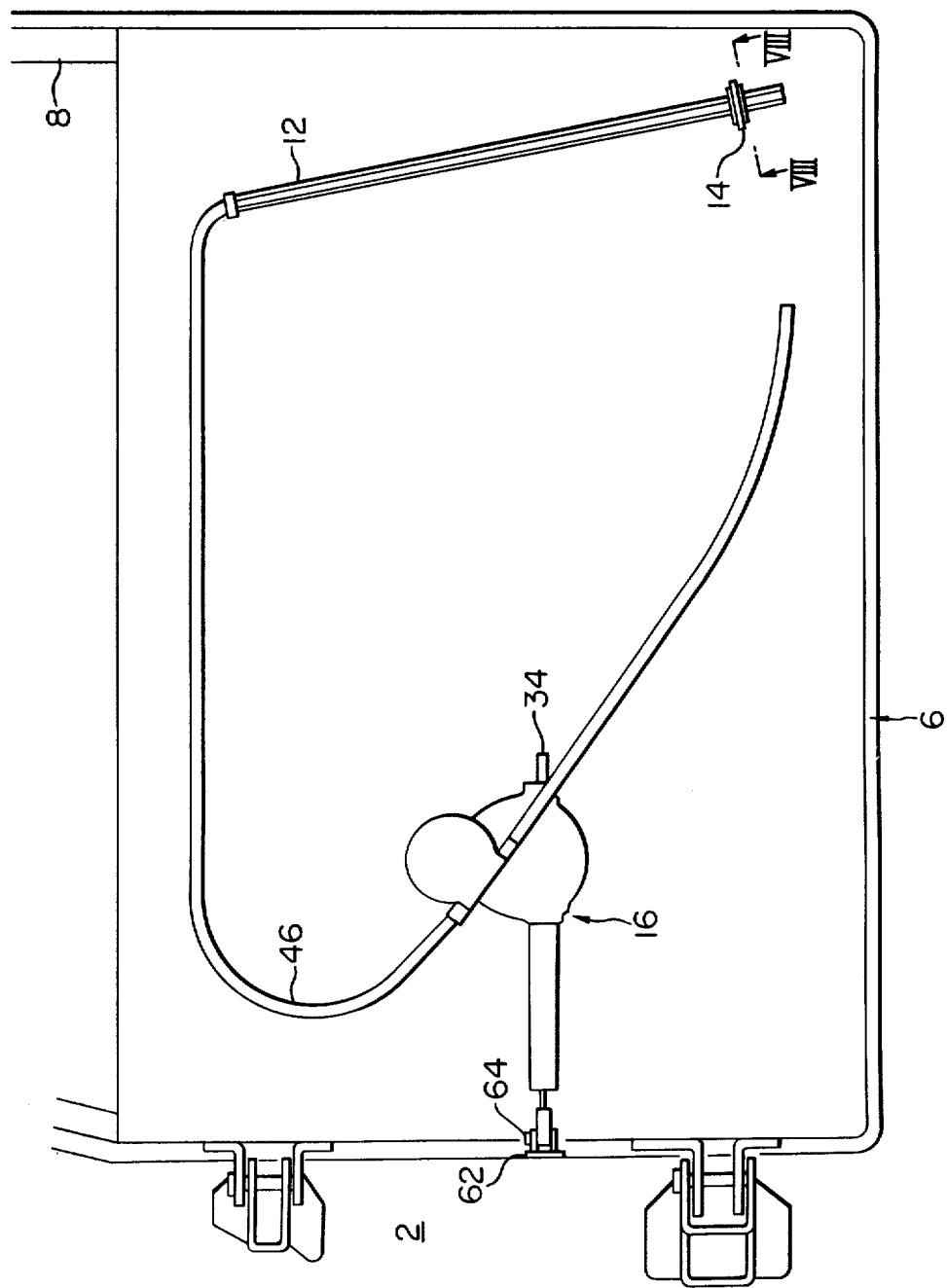
FIG. 3 is a schematic view of an actuator device and a guide of the seat belt mechanism.
Figure 4:
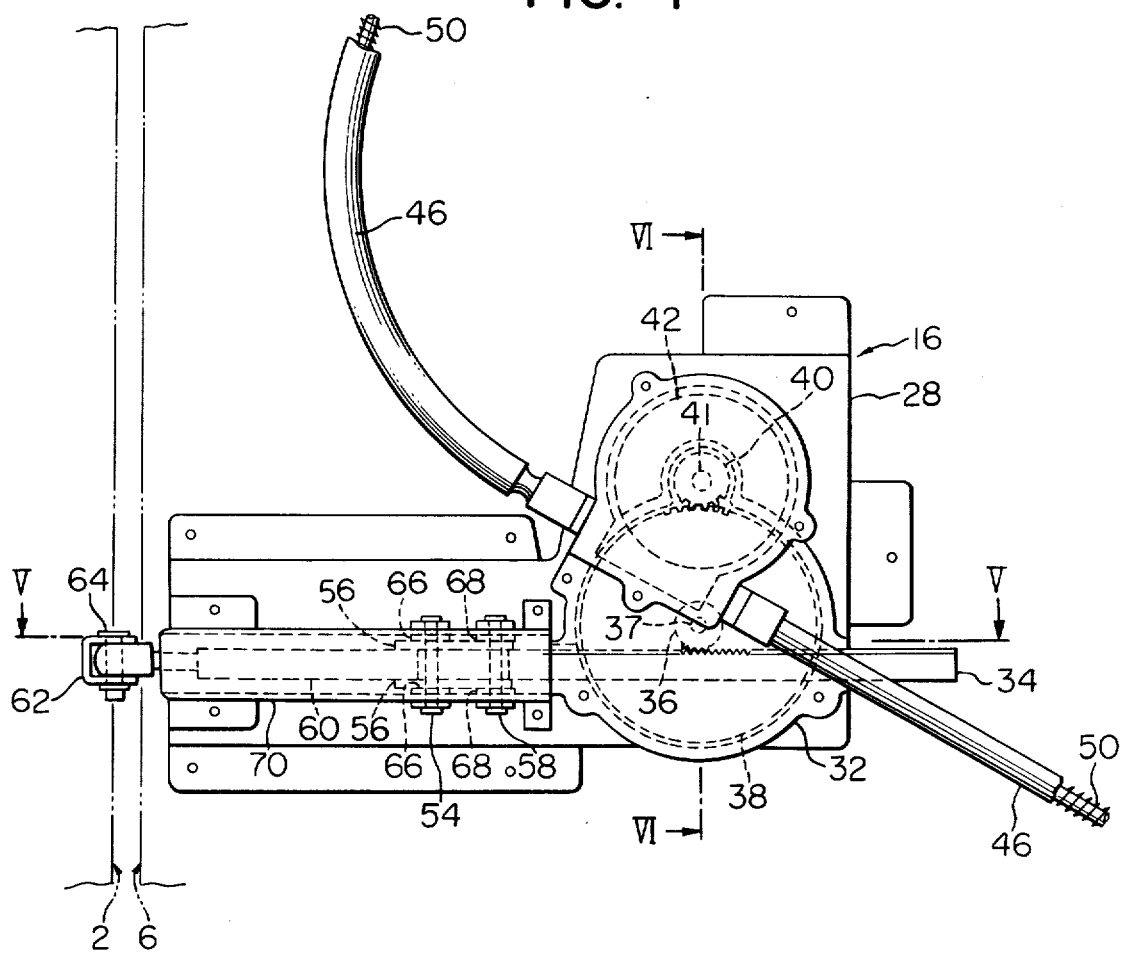
FIG. 4 is an enlarged front view of the actuator device in FIG. 3.

Referring to FIGS. 1 and 2, a motor vehicle comprises a body 2, a seat 4, and a door 6 pivotally supported at its forward edge by the body 2 and having a sash 8. This vehicle is associated with a seat belt mechanism according to this invention. The seat belt mechanism comprises a first through member 10 attached to the rearward and upper portion of the sash 8, a guide 12 provided in the rearward portion of the door 6 and extending substantially in a vertical direction, a second through member 14 slidably supported in the guide 12, an actuator device 16 adapted to move the second through member 14 along the guide 12 toward the lower portion of the door 6 when the latter is closed and toward the center portion of the door 6 when the latter is opened, a belt hold member 18 fixed through a bracket 17 to the seat 4 at the side thereof nearer to the center of the body 2, a retractor 20 with an emergency locking device provided in the door, a shoulder belt 24 having one end adapted to be reeled into the retractor 20 and the other end held by the belt hold member 18, and a waist belt 26 having one end adapted to be reeled into the retractor 20 and the other end held by the belt hold member 18. This design of the seat belt mechanism has the following advantageous effects:

(I) When the door 6 is opened as shown in FIG. 1, the shoulder belt 24 and the waist belt 26 are drawn out from the retractor 20, so that the shoulder belt 24 is stretched between the first through member 10 and the belt hold member 18, whereas the waist belt 26 is stretched between the belt hold member 18 and the second through member 14 which is moved toward the center portion of the door along the guide 12. As both of the belts 24 and 26 are moved away from the seat 4, the passenger can easily get into and out of the vehicle. Also, as the portion of the waist belt 26 at the door 6 is positioned at the center portion of the door, the passenger does not hit his knees against the waist belt 26.

(II) Since the portion of the waist belt 26 at the door 6 is positioned at the center portion of the door when the latter is opened, the respective portions of the shoulder and waist belts 24 and 26 at the door approach each other. Therefore, the passenger can readily confirm the positions of the shoulder belt 24 and the waist belt 26 when getting into the vehicle, thereby reducing the unpleasant visual feeling. Also, both the shoulder belt 24 and the waist belt 26 touch the relatively insensible abdomen of the passenger and at substantially the same portion of the abdomen, thereby reducing the unpleasant tactile feeling.

(III) When the passenger sits on the seat 4 and closes the door 6 as shown in FIG. 2, the shoulder belt 24 and the waist belt 26 are reeled back into the retractor 20. The shoulder belt 24 is stretched between the first through member 10 and the belt hold member 18 to restrain the upper body of the passenger, whereas the waist belt 26 is stretched between the belt hold member 18 and the second through member 14 which is moved toward the lower portion of the door along the guide 12, thereby restraining the waist of the passenger. Since both the shoulder belt 24 and the waist belt 26 are designed to be reeled into and drawn out from the retractor 20, when the shoulder belt 24 and the waist belt 26 come into contact and apart from the passenger upon closing and opening of the door 6, the belts scarcely contact frictionally with the clothes of the passenger, thereby reducing damage to the clothes of the passenger and unpleasant feeling sensed by the passenger due to fastening of the belts.

In more detail, one embodiment of the actuator device 16 is shown in FIGS. 3 to 7 and now explained.

Figure 5:
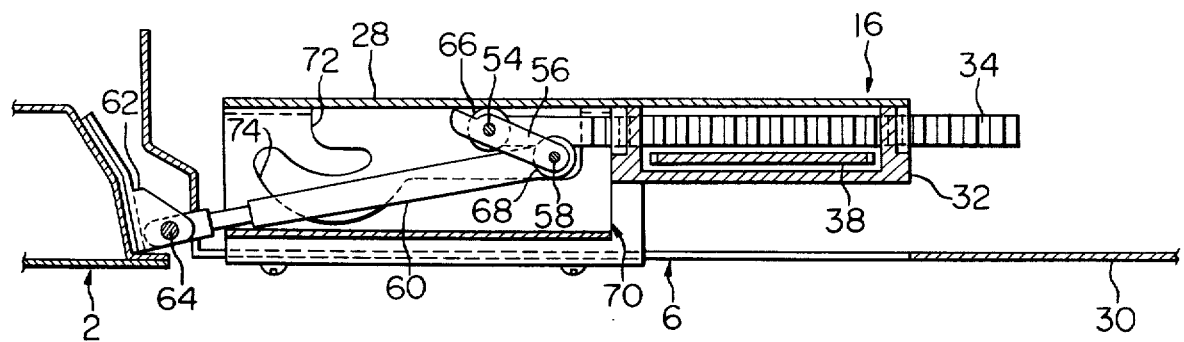
FIG. 5 is a cross-sectional view taken along the line V—V in FIG. 4.
Figure 6:
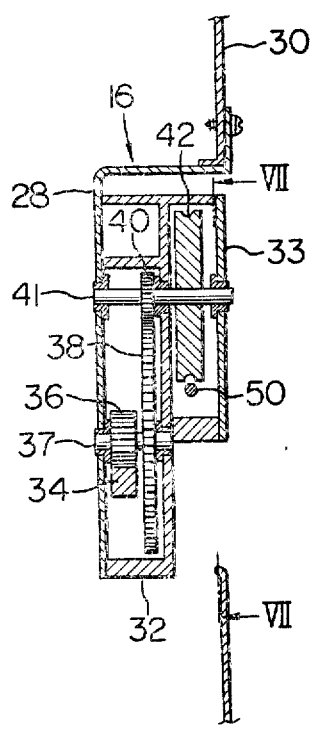
FIG. 6 is a cross-sectional view taken along the line VI—VI in FIG. 4.
Figure 7:
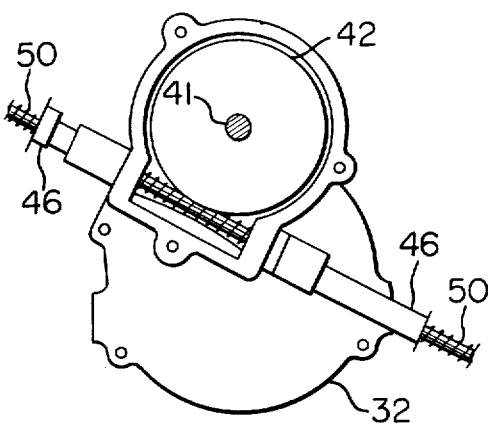
FIG. 7 is a cross-sectional view taken along the line VII—VII in FIG. 6.

The actuator device 16 includes a base plate 28 fixed to an inner panel 30 of the door 6, and a casing 32 having a cover 33 and fixed on the base plate 28. A rack 34 is supported in the casing 32 so as to move laterally in FIG. 3. A pinion 36 meshing with the rack 34 is fixedly mounted on a shaft 37 which is rotatably supported by the casing 32. A gear 38 having a diameter larger than that of the pinion 36 is also fixedly mounted on the shaft 37. A gear 40 meshing with the gear 38 is fixedly mounted on a shaft 41 which is rotatably supported by the casing 32. A drive wheel 42 having a diameter larger than that of the gear 40 and with a groove formed around its outer periphery is also fixedly mounted on the shaft 41. Tubes 46 are connected to the casing 32, and a cable 50 is slidably received in the tubes. A thin wire is helically wound on the periphery of the cable 50, so that the latter can positively engage with the drive wheel 42 in the casing 32. The rack 34 is pivotally connected to links 56 through a pin 54. The links 56 are pivotally connected to a connecting rod 60 through a pin 58. The connecting rod 60 is pivotally connected to a bracket 62 fixed to the body 2 through a pin 64 which is offset from a pivoting axis of the door 6 relative to the body 2. Rollers 66 are mounted on the pin 54, and rollers 68 are mounted on the pin 58. These rollers 66 and 68 are designed to abut with cam surfaces formed in a cam plate 70 fixed to the base plate 28 by screws or any other suitable means. The cam plate 70 is formed with first cam surfaces 72 on which the rollers 66 abut and with second cam surfaces 74 on which the rollers 68 abut. The rollers 66 abut on the left ends of the cam surfaces 72 when the rod 60 is drawn out from the door 6 through a predetermined amount. At this time, the links 56 and the rod 60 are maintained in an inflected condition as shown in FIG. 5. When the rod 60 is drawn out further, the rollers 68 slide and abut on arcuate portions of the cam surfaces 74 so that the links 56 can pivot about the pin 54 and align with the rod 60. Thus, it is ensured that the rack 34 is moved through a predetermined amount by drawing the rod 60 by the predetermined amount. Consequently, when the door 6 is opened, the rod 60 is drawn out from the door to move the rack 34 toward the left in FIG. 3. This movement rotates the drive wheel 42 through the gears 36, 38 and 40 to move the cable 50.

The actuator device 16 is not limited to the above described device, but may be any type of actuator device which operates in response to opening and closing of the door 6. The device can utilize any kind of interlocking mechanism such as a mechanical, hydraulic or electrical mechanism. For example, the gear 36 may be interlocked with an electric motor connected to a switch which operates in response to opening and closing of the door 6.

Figure 8:
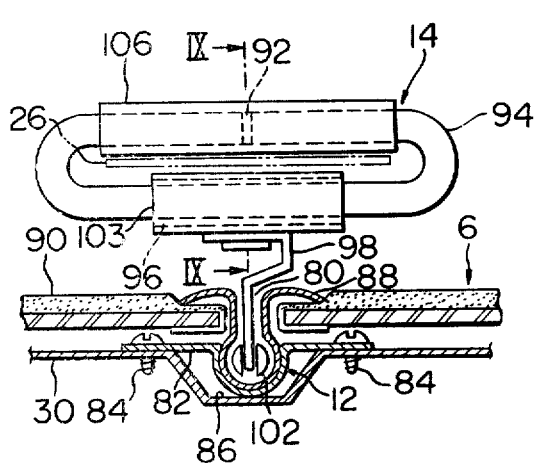
FIG. 8 is a cross-sectional view taken along the line VIII—VIII in FIG. 3.
Figure 9:
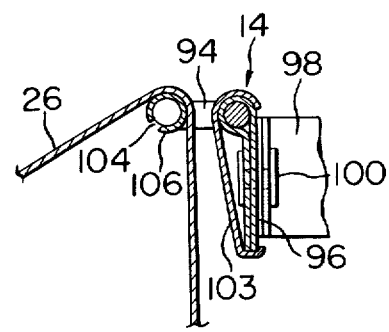
FIG. 9 is a cross-sectional view taken along the line IX—IX in FIG. 8.

One embodiment of the guide 12 provided in the rear portion of the door 6 and the second through member 14 guided in the guide 12 is shown in detail in FIGS. 8 and 9 and now explained.

The guide 12 includes a tubular member formed with a slit 80 which is opened toward the vehicle compartment and extends along a longitudinal axis of the tube. The guide is fixed to the inner panel 30 of the door by means of screws 84 through a bracket 82 welded to the guide and connected at its upper end to the tube 46. The door inner panel 30 is formed at a position corresponding to the location of the guide 12 with a recess 86 into which the guide 12 is received. Edges of the slit 80 of the guide 12 are extended and bent outwardly so as to press a trim member 90 on the surface of the inner panel 30 by said bent portions 88. If the guide 12 is made by extrusion, the bracket 82 can be formed integrally with the guide.

The second through member 14 has a ring member 94 made of a wire and having a slit 92, a bracket 96 supporting the ring member 94, a support member 98 connected to the cable 50 operated by the actuator device 16 and supporting the bracket 96, and a rivet 100 fastening the bracket 96 and the support member 98 together. A roller 102 is attached to the support member 98 for rolling in the guide 12. Also, a cover 103 of synthetic resin is attached to the support member 98. A tubular member 106 of preferably synthetic resin formed with a slit 104 along a longitudinal direction of the member is fitted on the ring member 94 so as to cover the slit 92. By this arrangement, the second through member 14 excluding the tubular member 106 is firstly attached to the door 6, and the waist belt 26 is inserted in the ring member 94 through a slit 92. Then, the tubular member 106 is fitted on the ring member 94. Therefore, it is unnecessary to insert the waist belt 26 in the second through member 14 before the latter is attached to the door 6, thereby greatly improving installation of this through member. The tubular member 106 is not necessarily needed, and if it is deleted, only the apparatus and the friction between the waist belt 26 and the through member deteriorate slightly.

Figure 10:
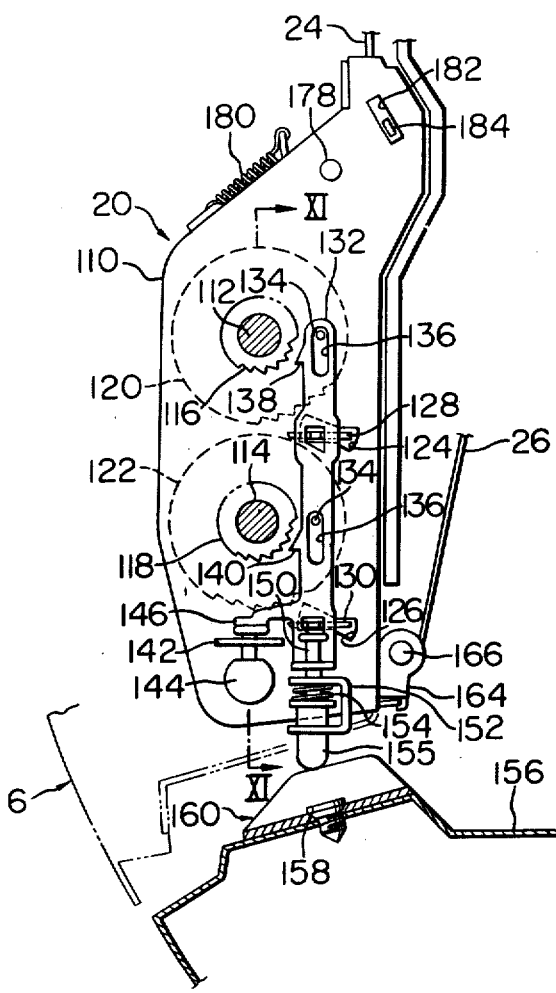
FIG. 10 is a side view of one embodiment of a retractor of the seat belt mechanism.
Figure 12:
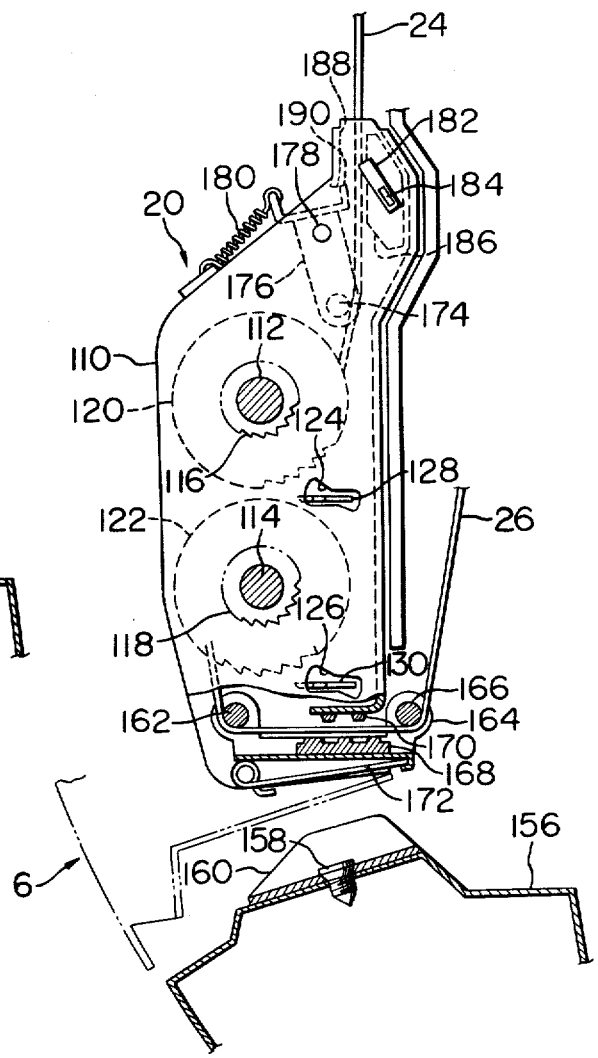
FIG. 12 is a side view of the retractor, partially in cross-section, in which an interlocking member, bracket, pendulum, retainer and detaining member in FIG. 10 are deleted.
Figure 11:
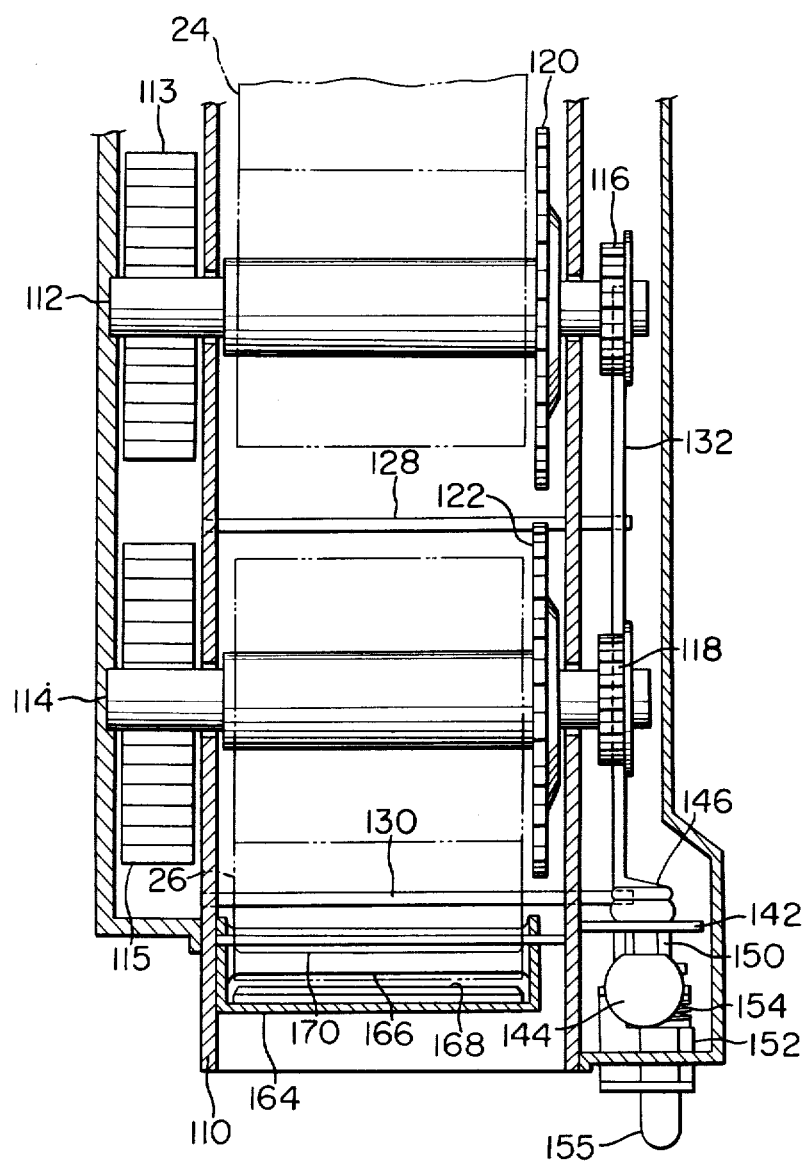
FIG. 11 is a cross-sectional view taken along the line XI—XI in FIG. 10.

One embodiment of the retractor 20 is shown in FIGS. 10 to 12 and now explained.

The retractor 20 includes a retractor casing 110 fixed to the door 6. A reel shaft 112 for reeling the shoulder belt 24 and a reel shaft 114 for reeling the waist belt 26 are rotatably supported by the casing 110 and biased respectively by spiral springs 113 and 115 in the directions that the belts are wound up. Rachet wheels 116 and 118 and rachet wheels 120 and 122 having diameters larger than those of the rachet wheels 116 and 118 are fixedly mounted on the reel shafts 112 and 114 respectively. The casing 110 is formed with slots 124 and 126 of a butterfly shape in which pawls 128 and 130 engageable with the rachet wheels 120 and 122 are disposed respectively. An interlocking member 132 is interlocked with the pawls 128 and 130 and adapted to move only in a vertical direction by inserting pins 134 provided on the casing 110 through elongated slots 136 formed in the interlocking member. The interlocking member 132 is integrally formed with pawls 138 and 140 engageable with the rachet wheels 116 and 118. A pendulum 144 is tiltably supported by a bracket 142 provided on the casing 110, and the upper end of the pendulum 144 abuts on an arm 146 integrally formed with the interlocking member 132. In an emergency of the vehicle such as a collision or abnormal inclination (roll or diving) of the vehicle, the pendulum 144 is tilted to lift up the interlocking member 132 through the arm 146, so that the pawls 138 and 140 on the member 132 engage with the rachet wheels 116 and 118. Since the rachet wheels 116 and 118 are rotated by drawing of the belts 24 and 26, the interlocking member 132 is further lifted up by engagement of the rachet wheels 116 and 118 and the pawls 138 and 140 to rotate the pawls 128 and 130 in a clockwise direction in FIGS. 10 and 12. The pawls 128 and 130 engage with the rachet wheels 120 and 122 to prevent rotation of the belt reel shafts 112 and 114.

Of course, either set of the pawl 138 and the rachet wheel 116 or the pawl 140 and the rachet wheel 118 may be deleted.

However, in the above described arrangement, when the door 6 is opened violently, there is a risk that the pendulum 144 is tilted to lock the belts 24 and 26 in the described manner, so that the door 6 cannot be opened further. In order that the pendulum 144 is tilted only when the door 6 is closed, there is provided a detaining member 150 for urging the interlocking member 132 downwardly when the door 6 is not closed. The detaining member 150 is slidably supported by a retainer 152 fixed to the casing 110 and always biased downwardly by a spring 154. The detaining member 150 is so designed that the upper end thereof engages with the lower end of the interlocking member 132 to prevent the upward movement of the interlocking member 132 when the door 6 is opened, whereas an abutment portion 155 on the lower end of the detaining member abuts on an abutment 160 fixed by means of a screw 158 to a body side sill 156 beneath the door 6 to move the detaining member 150 upwardly so as to prevent interference of movement of the interlocking member 132 when the door 6 is closed. Furthermore, this retractor 20 has an arm 164 pivotally mounted on the casing 110 by a shaft 162 to which the waist belt 26 contacts. The arm 164 is provided with a shaft 166 to which the waist belt 26 contacts and a clamp member 168 having a rugged surface. Each of the shafts 162 and 166 may have mounted thereon a tubular member (not shown) to which the belt 26 contacts. A clamp member 170 having a rugged surface is provided on the casing 110 opposite to the clamp member 168. The arm 164 is urged downwardly by a spring 172. The force of the spring 172 is such that the arm 164 is prevented from rotating when the waist belt 26 is drawn in normal use, but the arm 164 is allowed to rotate about the shaft 162 upwardly (in a counterclockwise direction in FIG. 12) by a pulling force applied to the waist belt 26 to clamp the belt by cooperation of the clamp members 168 and 170 and to prevent drawing of the belt when rotation of the reel shaft 114 is prevented in an emergency. As a result, after the reel shaft 114 is prevented from rotating, further drawing of the waist belt 26 due to tightening of the belt wound on the reel shaft 114 can be prevented.

Furthermore, an arm 176 having a shaft 174 to which the shoulder belt 24 contacts is pivotally mounted on the casing 110 by a shaft 178. The shaft 174 may have mounted thereon a tubular member (not shown). The arm 176 is urged to bend the shoulder belt 24 by a spring 180, a force of which prevents rotation of the arm 176 when the shoulder belt is drawn in normal use. A stopper member 186 having keys 184 guided in guides 182 formed in the casing 110 can move to press the shoulder belt 24 on an abutment surface 188 formed on the casing 110 when it is moved in a direction corresponding to drawing of the shoulder belt 24. That is, when rotation of the reel shaft 112 is prevented in an emergency, the arm 176 is rotated about the shaft 178 in a clockwise direction in FIG. 12 by a pulling force applied to the shoulder belt 24 to permit a pressing portion 190 formed on the arm 176 to press the shoulder belt 24 onto the stopper member 186. By frictional engagement with the shoulder belt 24 to be drawn, the stopper member 186 is moved upwardly to press the shoulder belt 24 onto the abutment surface 188 on the casing 110, thereby preventing drawing of the shoulder belt 24. Thus, further drawing of the shoulder belt 24 due to tightening thereof can be prevented as in the case of the waist belt 26.

In connection with the detaining member 150 for detaining the interlocking member 132 when the door 6 is not closed, if the retractor 20 cannot be located in the lower end section of the door 6 due to a space relationship or if it is impossible to form the detaining member 150 integrally with the abutment portion 155, the detaining member 150 and the abutment portion 155 may be formed separately and appropriately interlocked with each other.

One embodiment of said construction is shown in FIGS. 13 to 16 and now explained. The elements substantially the same as those in FIGS. 10 to 12 are designated by the same numerals and not explained in detail.

Figure 13:
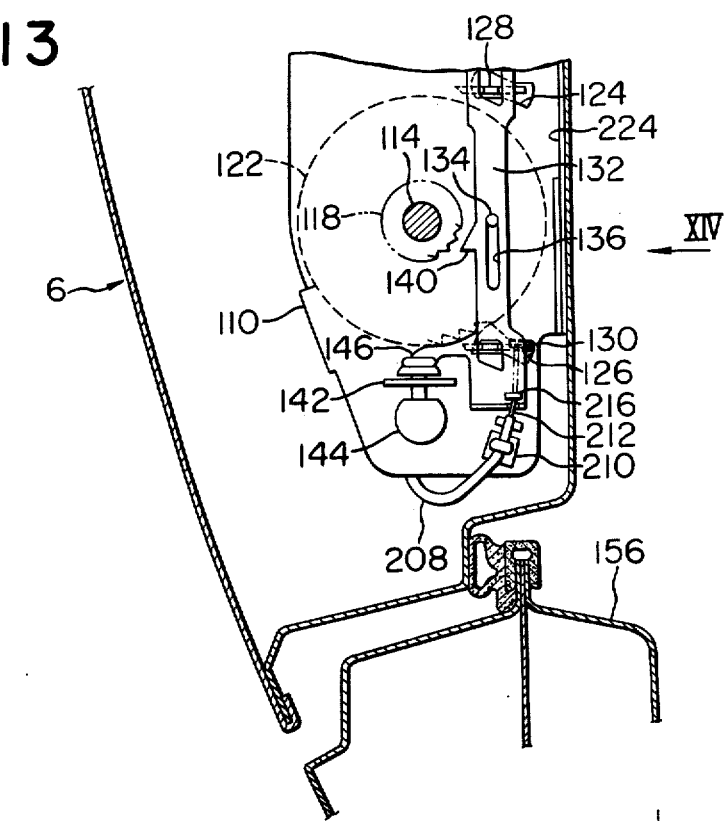
FIG. 13 is a side view of another embodiment of the retractor in which the detaining member is modified.
Figure 14:
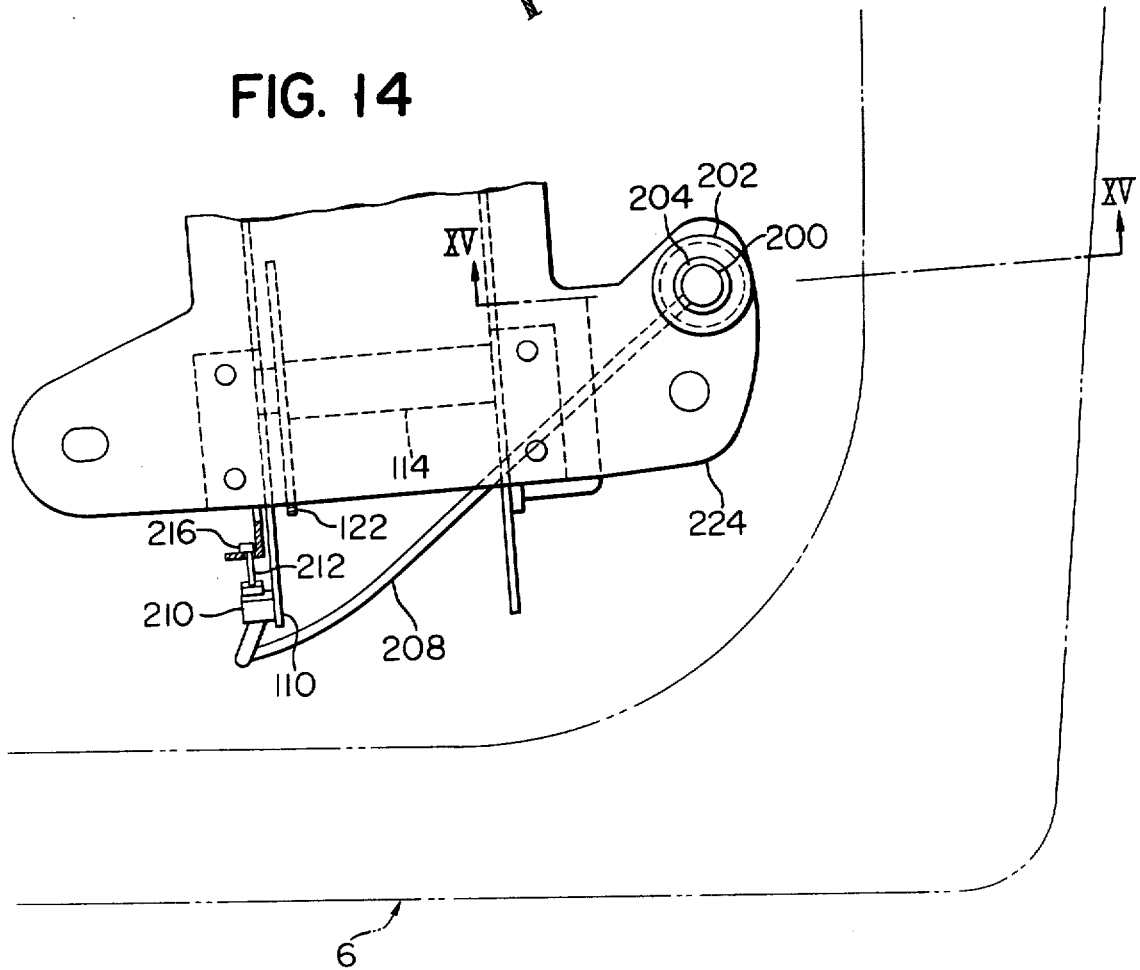
FIG. 14 is a view seeing along an arrow XIV in FIG. 13.
Figure 15:
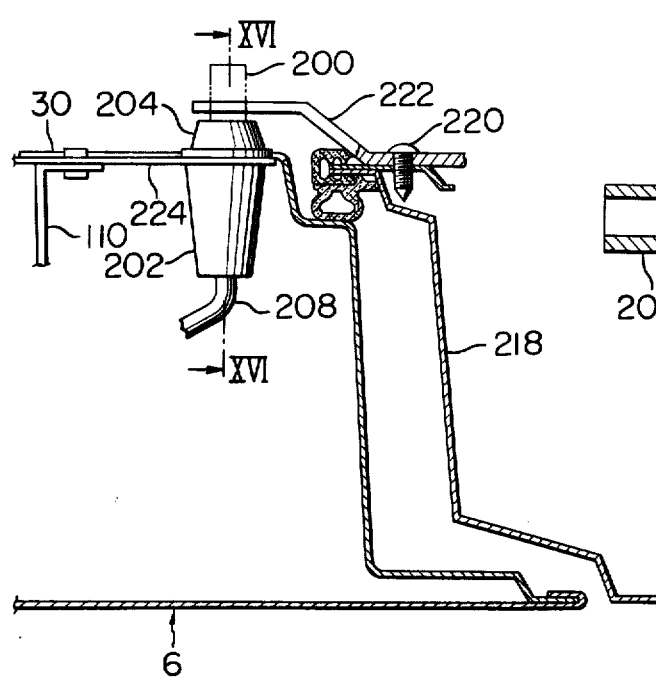
FIG. 15 is a cross-sectional view taken along the line XV—XV in FIG. 14.
Figure 16:
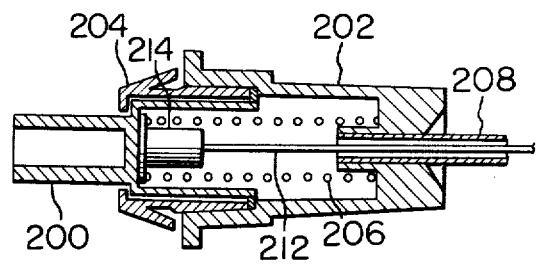
FIG. 16 is a cross-sectional view taken along the line XVI—XVI in FIG. 15.

An abutment member 200 abutting on the vehicle body is slidably supported by a cap 204 fixed to a tubular case 202 by way of for example threads and biased by a spring 206 so that the forward end of the abutment member 200 always protrudes from the cap. A tube 208 is connected at one end to the case 202 and at the other end to a bracket 210 fixed to the retractor casing 110. One end of a cable 212 received in the tube 208 is connected to the rearward end of the abutment member 200 through a connector 214, while the other end extends from the tube 208 to pass through the interlocking member 132 and fitted at its extremity with a detaining member 216. When the door 6 is not closed, the abutment member 200 is moved to protrude from the cap 204 by the spring 206. This movement is transmitted through the cable 212 to move the detaining member 216 to prevent the upward movement of the interlocking member 132, as shown in FIG. 13. When the door 6 is closed, the abutment member 200 abuts on an abutment 222 fixed to a pillar 218 disposed rearwardly of the door 6 by means of a screw 220 and moves into the cap 204. This movement is transmitted through the cable 212 to move the detaining member 216 into a position in which the upward movement of the interlocking member 132 is not interfered, as shown by a two-dot chain line in FIG. 13. The case 202 is fixed to a base plate 224 which is attached to the inner panel 30 of the door 6 and to which the retractor casing 110 is fixed.

Figure 17:
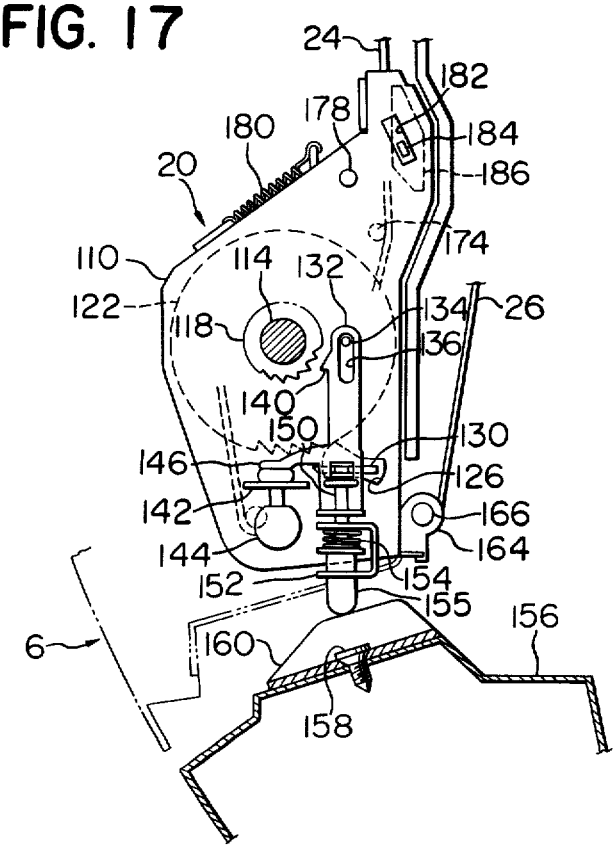
FIG. 17 is a side view of a further embodiment of the retractor.

A further embodiment of the retractor 20 is shown in FIG. 17 and now explained. The elements substantially the same as those in FIGS. 10 to 12 are designated by the same numerals and not explained in detail.

This retractor 20 is so designed that the shoulder belt 24 and the waist belt 26 are reeled on a single reel shaft 114, one over the other. As in the retractor shown in FIGS. 10 to 12, in an emergency of the vehicle, the interlocking member 132 lifted up through the arm 146 by tilting movement of the pendulum 144 is further lifted up by engagement of the pawl 140 and the rachet wheel 118 rotated by drawing of the belts, so that the pawl 130 is rotated in a clockwise direction in FIG. 17 to engage and detain the rachet wheel 122, whereby preventing rotation of the belt reel shaft 114.

As in the retractor shown in FIGS. 10 to 12, this retractor 20 is also provided with the stopper member 186 and the arm 164 for preventing further drawing of the shoulder belt 24 and the waist belt 26 due to tightening of the belts, and the effect obtained by this arrangement is the same as the previously described embodiment.

This retractor 20 is arranged to reel the shoulder belt 24 and the waist belt 26 onto the common shaft, one over the other, and can be made extremely compact, but two retractors may be used to independently reel the shoulder belt 24 and the waist belt 26. Of course, the locking device of the seat belt retractor is not limited to a gravity sensing type as described above, it may be a type that senses a rapid drawing of the belt to lock the latter.

One embodiment of the first through member 10 attached to the sash 8 of the door 6 is shown in FIGS. 18 to 22 and now explained.

The first through member 10 includes a base member 234 fixed to a flange portion 230 defined on the sash 8 by screws 232, a support plate 238 bent to hold the base member 234 and pivotally attached thereto by a shaft or rivet member 236, and a through ring 240 made by a wire and suspended by the inner surface of the bent portion of the support plate 238. The shoulder belt 24 is inserted through the through ring 240. Also, the first through member 10 has a cover 242 of synthetic resin covering the outer surface of the support plate 238 as indicated by a two-dot chain line in FIGS. 19 and 20. As shown in detail in FIGS. 21 and 22, the cover 242 has a portion 244 covering one side of the support plate 238 and another portion 246 covering the outer side of the support plate 238. The portions 244 and 246 are connected to each other by a hinge portion 248 and have hook portions 250 which are adapted to be detained on the upper end of the support plate 238. These portions of the cover 242 are made of synthetic resin and integrally formed with each other. Furthermore, the cover 242 is integrally formed with latches 252 and recesses 254 detaining the latches therein.

The sash 8 to which the first through member 10 is attached must be made to bear an inertia energy of the passenger which is produced when the passenger is strongly thrown forwardly from the seat 4 and the shoulder belt 24 is strongly pulled upon collision of the vehicle. If the sash 8 cannot be made to have such a strength, it is desirable to construct such that the load acting on the first through member 10 is transferred to the pillar 218 rearwardly of the door 6.

Figure 18:
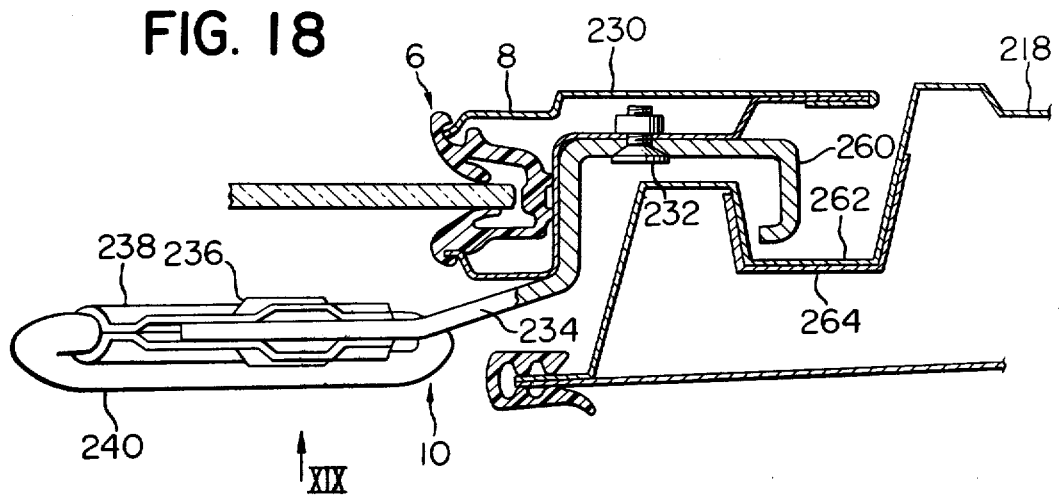
FIG. 18 is a cross-sectional view of one embodiment of a first through member, cutting along a horizontal plane of a connection between said member and a sash.
Figure 19:
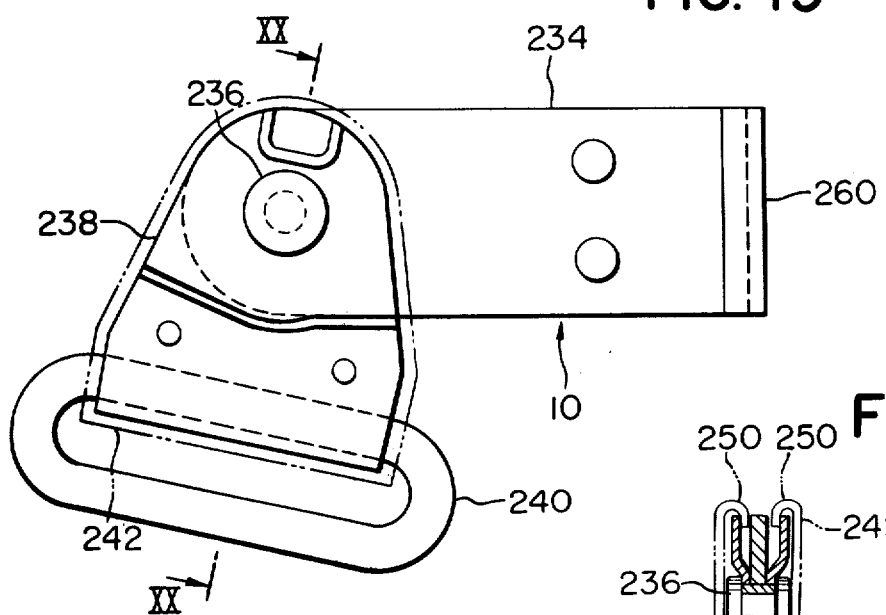
FIG. 19 is a view seeing along an arrow XIX in FIG. 18.
Figure 20:
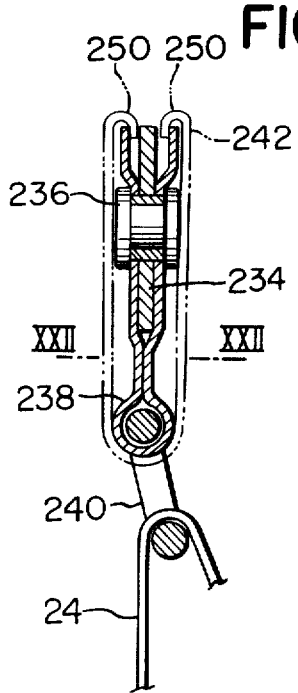
FIG. 20 is a cross-sectional view taken along the line XX—XX in FIG. 19.
Figure 21:
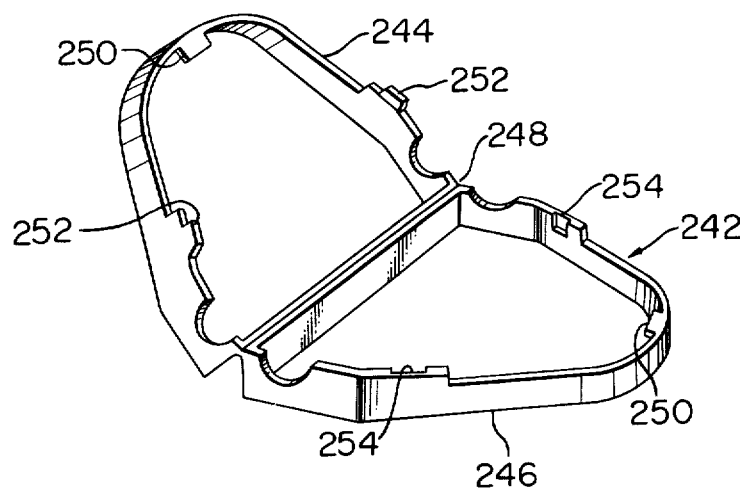
FIG. 21 is a perspective view of a cover used for the first through member, the cover being in its open condition.
Figure 22:
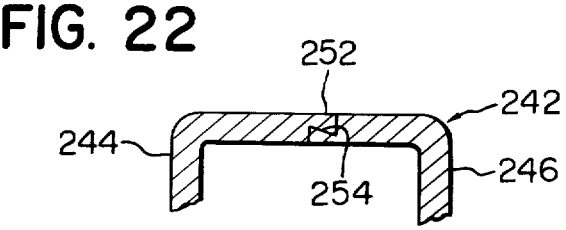
FIG. 22 is a cross-sectional view of the cover, taken along the line XXII—XXII in FIG. 20.

To this end, the first through member 10 has a striker 260 integrally formed with the base member 234 and projected toward the center of the vehicle body, while the pillar 218 is formed with a recess 262 into which the striker 260 enters when the door 6 is closed, as shown in FIG. 18. The striker 260 is designed that it abuts on a side of the recess 262 when the shoulder belt 24 is strongly pulled forwardly by forward movement of the passenger and the sash 8 is deformed. The recess 262 is integrally formed with a panel constituting the pillar 218 and a reinforcing member 264 is fixed around the recess 262.

It is preferable that the first through member 10 can move vertically by a given amount so that strangling of a passenger having a small physique by the shoulder belt 24 is prevented. Various embodiments of the first through member 10 arranged as the above are shown in FIGS. 23 to 30 and now explained. The elements substantialy the same as those in FIGS. 18 to 22 are designated by the same numerals and not explained in detail.

Figure 23:
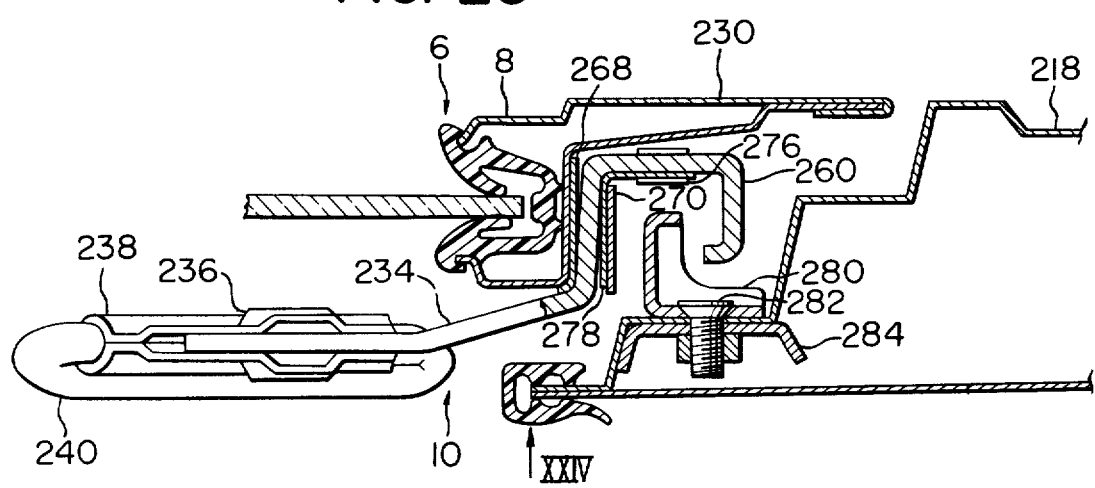
FIG. 23 is a cross-sectional view similar to FIG. 18, the first through member being attached to the sash in a different way.
Figure 24:
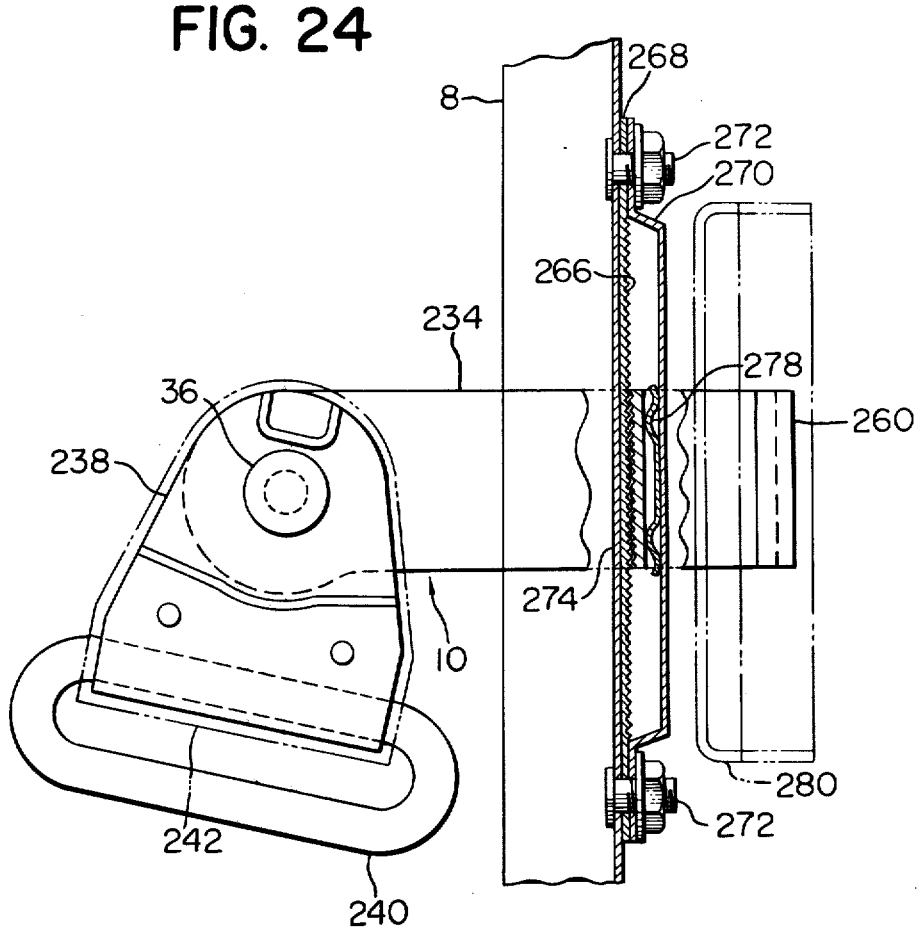
FIG. 24 is a view seeing along an arrow XXIV in FIG. 23, a pillar being deleted.

In the embodiment shown in FIGS. 23 and 24, a first guide plate 268 formed on its surface with serrated grooves 266 and a second guide plae 270 defining a given clearance with the first guide plate are fixed to the sash 8 by nuts and bolts 272. The base member 234 of the first through member 10 is interposed between the guide plates 268 and 270 and formed with serrated grooves 274 at its abutting surface opposite to the first guide plate 268. The serrated grooves 266 and 274 mate with each other and extend horizontally of the vehicle. The rearward end of the base member 234 is integrally formed with the striker 260. A spring 278 having one end fixed to the base member 234 by a rivet 276 is compressed between the base member 234 and the second guide plate 270, so that the base member 234 of the first through member 10 is always urged to the left in FIGS. 23 and 24 by the spring 278 to engage its serrated grooves 274 with the serrated grooves 266 on the first guide plate 268, thereby preventing the vertical movement of the first through member. When the height of the first through member 10 is adjusted, the first through member 10 is urged to the right in FIGS. 23 and 24 in opposition to the spring 278 to disengage the serrated grooves 274 from the serrated grooves 266. Then, the first through member 10 is moved upwardly or downwardly to a given position, maintaining the above condition. When a force in the rightward direction is released, the first through member 10 is urged by the spring 278 to engage the serrated grooves 266 and 274 with each other at said given position, thereby preventing the vertical movement of the first through member 10 again. A catch 280 extending over the entire range of movement of the striker 260 of the first through member 10 and a reinforcing member 284 are fixed to the pillar 218 by screws 282. The striker 260 abuts on the catch 280 to prevent an additional forward movement of the first through member 10 when the latter is strongly pulled forwardly by the shoulder belt 24 and the sash 8 is deformed upon collision of the vehicle.

Figure 25:
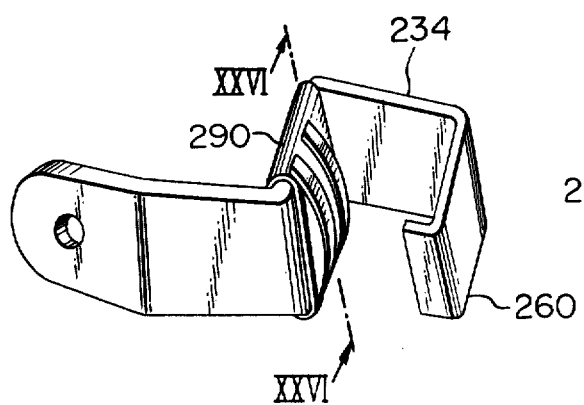
FIG. 25 is a perspective view of a base member of the first through member, a spring member being attached to the base member.
Figure 26:
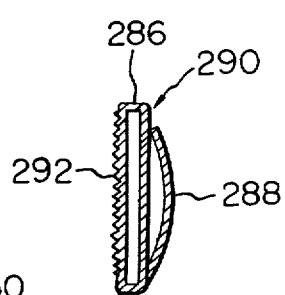
FIG. 26 is a cross-sectional view of the spring member, taken along the line XXVI—XXVI in FIG. 25.

The spring 278 may be replaced by a spring member 290 having a tubular section 286 and a spring section 288 which are integrally formed and made of synthetic resin, as shown in FIGS. 25 and 26. Also, the tubular section 286 may be formed with serrated grooves 292. In this case, the first through member 10 can be made less costly than the one in which the serrated grooves 274 are directly formed on the base member 234.

Figure 27:
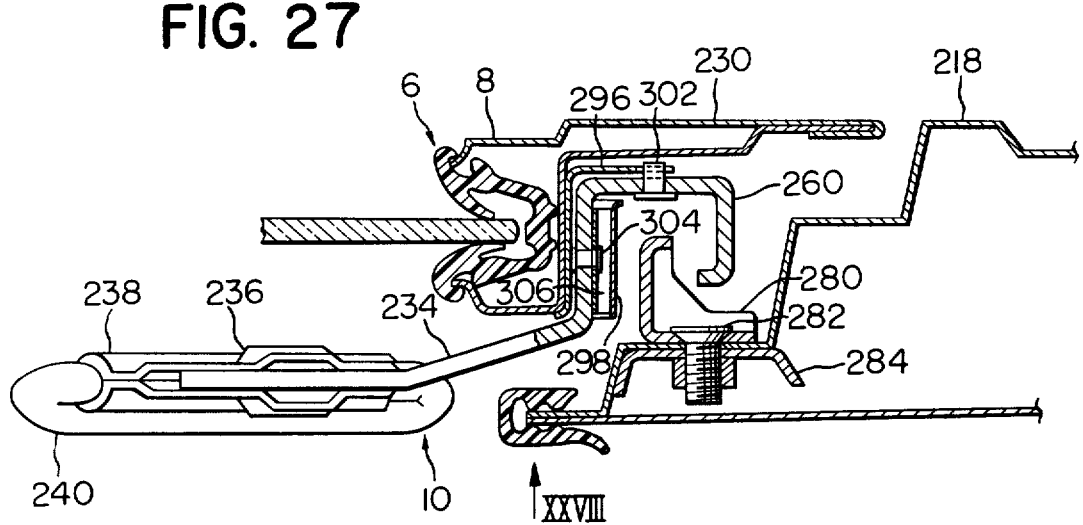
FIG. 27 is a cross-sectional view similar to FIG. 18, the first through member being attached to the sash in another different way.
Figure 28:
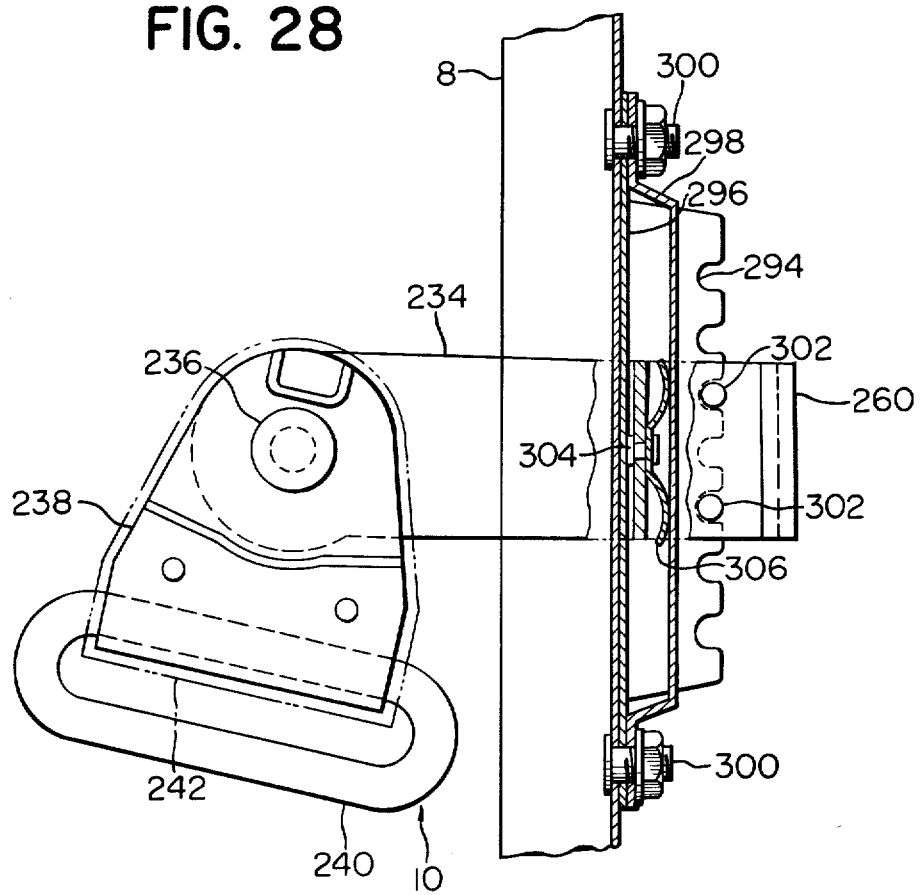
FIG. 28 is a view seeing along an arrow XXVIII in FIG. 27, the pillar being deleted.

In another embodiment shown in FIGS. 27 and 28, a first guide plate 296 having a rearwardly extending portion formed with a plurality of notches 294 and a second guide plate 298 are fixed to the sash 8 by nuts and bolts 300. The base member 234 of the first through member 10 is interposed between the guide plates 296 and 298 and provided with lock pins 302 engageable in the notches 294 in the first guide plate 296. The rearward end of the base member 234 is integrally formed with the striker 260. A spring 306 having a center portion fixed to the base member 234 by a rivet 304 is compressed between the base member 234 and the second guide plate 298, so that the first through member 10 is always urged to the left in FIGS. 27 and 28 by the spring 306 to engage the lock pins 302 in the notches 294 in the first guide plate 296, thereby preventing the vertical movement of the first through member. When the height of the first through member 10 is adjusted, the first through member 10 is urged to the right in FIGS. 27 and 28 in opposition to the spring 306 to disengage the lock pins 302 from the notches 294. Then, the first through member 10 is moved upwardly or downwardly to a given position, maintaining the above condition. When a force in the rightward direction is released, the first through member 10 is urged by the spring 306 to engage the lock pins 302 in the notches 294 at said given position, thereby locking the first through member 10 relative to the sash 8 again. Since the catch 280 and the reinforcing member 284 fixed to the pillar 218 are identical to and have the same function as those in FIGS. 23 and 24, they are not explained in detail.

Of course, in this embodiment, the spring 306 may be replaced by the spring member 290 shown in FIGS. 25 and 26. In this case, it is unnecessary to form the serrated grooves 292 on the spring member 290.

In a further embodiment shown in FIGS. 29 and 30, a first flat guide plate 308 and a second guide plate 312 having a forwardly extending flange 310 are fixed to the sash 8 by nuts and bolts 314. The base member 234 of the first through member 10 is interposed between the guide plates 308 and 312 and integrally formed at its rearward end with the striker 260. A spring clip 316 is fixed at its one end to the base member 234 by a rivet 318 and bent to an M shape to hold the flange 310 of the second guide plate 312, so that the base member 234 of the first through member 10 is locked relative to the sash 8 by this clip 316. When the height of the first through member 10 is adjusted, a lever 319 attached to a free end of the spring clip 316 is pressed to release a holding force of this spring 316 to the flange 310. Then, the first through member 10 is moved upwardly or downwardly to a given position, maintaining the above condition. When the pressing force onto the lever 319 is released, the first through member 10 is locked relative to the sash 8 at said position by the spring clip 316 again. Since the catch 280 and the reinforcing member 284 fixed to the pillar 218 are identical to and have the same function as those in FIGS. 23 and 24 and FIGS. 27 and 28, they are not explained in detail.

Of course, in the embodiments shown in FIGS. 23 to 30, the catch 280 may be replaced by the recess 262 formed in the pillar 218 as shown in FIG. 18.

Figure 31:
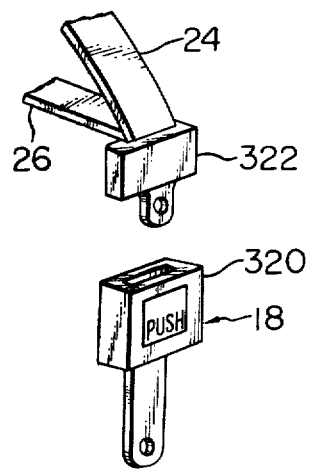
FIG. 31 is a perspective view of one embodiment of a belt support member.

One embodiment of the belt hold member 18 is shown in FIG. 31 and now explained.

The belt hold member 18 includes a buckle 320. Ends of the shoulder belt 24 and the waist belt 26 are fixed to a tongue 322 which is attachable to and detachable from the buckle 320. On the contrary, the belt hold member 18 may include the tongue 322 while the ends of the shoulder belt 24 and the waist belt 26 are fixed to the buckle 320.

However, if the belt hold member 18 shown in FIG. 31 is used with the retractor in which the shoulder belt 24 and the waist belt 26 are reeled onto the common reel shaft, one over the other, as shown in FIG. 17, either the shoulder belt 24 or the waist belt 26 is loosened and cannot sufficiently restrain the passenger. This disadvantage can be avoided by constituting the shoulder belt 24 and the waist belt 26 as a single continuous belt which is movably inserted through the belt hold member 18.

Figure 32:
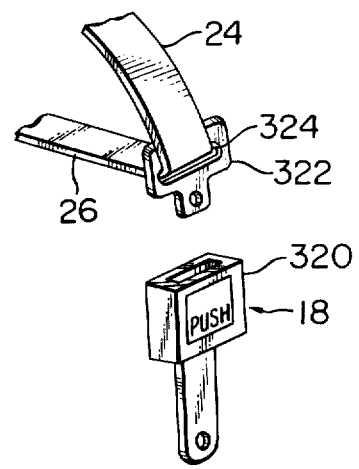
FIG. 32 is a perspective view of another embodiment of the belt support member.

One embodiment of the belt hold member 18 having such a constitution is shown in FIG. 32 and now explained. The tongue 322 is formed with an aperture 324 through which the belt is inserted. If the belt hold member of this type is not associated with the retractor which reels the shoulder belt 24 and the waist belt 26 one over the other as shown in FIG. 17, an area of the aperture 324 of the tongue 322 may be reduced to frictionally resist the movement of said belt relative to the tongue 322, as desired.

Figure 33:
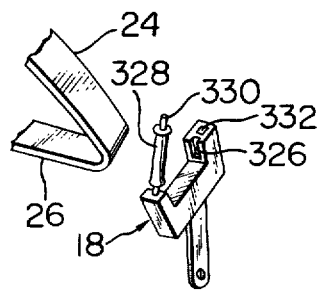
FIG. 33 is a perspective view of a further embodiment of the belt support member.

Furthermore, in another embodiment shown in FIG. 33, the belt hold member 18 is formed with a groove 326 into which one end of a shaft member 330 mounting a tubular member 328 thereon is engageable. The other end of the shaft member 330 is pivotally supported on the belt hold member 18. According to this embodiment, when the shoulder belt 24 and the waist belt 26 are not necessarily used, a release button 332 is pushed to disengage the one end of the shaft member 330 from the groove 326. Consequently, the shoulder belt 24 and the waist belt 26 are removed from the belt hold member 18 and stretched between the first through member 10 and the second through member 14 substantially along the rearward edge of the door 6. Therefore, unpleasant visual feeling sensed by the passenger due to the existence of the belts is reduced. Also, since none of the metal fittings or the like exists in the middle of the stretched belt, noises due to striking the fittings against the door 6 or the window glass thereof are not generated.

The belt hold member 18 may be secured to a floor panel of the vehicle body at a center portion thereof.

In the embodiment of the vehicle associated with the seat belt mechanism according to this invention, as shown in FIG. 1, a grip 340 extending forwardly of the vehicle is fixed to the inner side of the door 6 at above the upper end of the guide 12. This grip 340 avoids such a disadvantage that when the passenger sits on the seat 4 in the open condition of the door 6 as shown in FIG.

1 and his arm is positioned below the waist belt 26 to hold the door 6 in order to close the door 6, the waist belt 26 clings to the arm and therefore the passenger must re-hold the door 6, since the second through member 14 on the door and the waist belt 26 move downwardly as the door 6 is closed. When the door 6 is closed, the passenger moves his arm between the waist belt 26 and the shoulder belt 24 and holds the grip 340 to close the door 6, so that the waist belt 26 does not cling to the arm. Also, when getting into the vehicle, the passenger firstly holds the rearward end of the grip 340 and slides his arm toward the forward end of the grip. Then, the passenger sits on the seat 4 and closes the door 6, holding said forward end of the grip. By this order, the passenger can close the door 6 in the quickest way. When the passenger opens the door 6, sitting on the seat 4, the passenger holds the grip 340 to open the door 6, so that clinging of the waist belt 26 to the arm due to the upward movement of the portion of the waist belt near the door is prevented.

What is claimed is:

1. A seat belt mechanism comprising a first through member attached to a rearward and upper portion of a sash of a door of a vehicle, the forward edge of said door being pivotally supported by a vehicle body, a guide provided in the rearward portion of said door and extending vertically, a second through member guided in the guide, an actuator device for moving said second through member toward the lower portion of said guide when said door is closed and toward a position above said lower portion of said guide when the door is opened, a belt hold member fixed to either a seat adjacent to said door or the body so as to be positioned near to the center of the body, at least one retractor fixed to said door, a shoulder belt extending through said first through member and having one end adapted to be reeled into said retractor and the other end held by said belt hold member, and a waist belt extending through said second through member and having one end adapted to be reeled into said retractor and the other end held by said belt hold member;

said retractor including at least one belt reel shaft and at least one locking device for preventing rotation of said belt reel shaft in an emergency of the vehicle, said locking device being maintained inoperative when said door is not closed; and said retractor also including at least one press member normally urged by a spring into contact with one of the belts to bend the latter and moved by a stretching force of said one belt when the reel shaft is locked to prevent its rotation when said one belt is pulled, and at least one stopper member operated by movement of said press member to detain said one belt.

2. A seat belt mechanism according to claim 1, wherein said locking device includes first and second elements fixed to said belt reel shaft, a locking element engageable with said first first element for detaining the latter, an operating member engageable with said second element and operating said locking element when the operating member engages with the second element and said belt reel shaft is rotated in a direction corresponding to drawing of the belts, an emergency sensor for sensing an emergency of the vehicle to engage said operating member with said second element, and detaining means having a detaining member urged by a spring to detain said operating member so as to prevent operation of said locking element, and an abutment member abutting on said vehicle body to move said detaining member into a non-detaining position relative to the operating member when said door is closed.

3. A seat belt mechanism according to claim 2, wherein said abutment member protrudes from said door and abuts on the body to move said detaining member into the non-detaining position relative to said operating member when said door is closed.

4. A seat belt mechanism according to claim 3, wherein said abutment member protrudes downwardly from a bottom surface of said door and abuts on an inclined surface on a side sill defining a lower edge of an opening for the door when the door is closed.

5. A seat belt mechanism according to claim 3, wherein said abutment member protrudes horizontally toward a compartment of the vehicle from an inner surface of said door and abuts on an abutment fixed to either a pillar or a side sill when the door is closed, said pillar and side sill defining an opening for the door.

6. A seat belt mechanism according to claim 3, wherein said detaining member and said abutment member are interconnected with each other by a cable.

7. A seat belt mechanism according to claim 1, wherein said retractor includes a reel shaft for said shoulder belt, a reel shaft for said waist belt and a single casing fixed to said door, said reel shafts being supported in said casing.

8. A seat belt mechanism according to claim 7, wherein said retractor includes the locking device for said shoulder belt and the locking device for said waist belt, said locking devices being interlocked with each other by an interlocking member.

9. A seat belt mechanism according to claim 8, wherein said interlocking member is operated by a single emergency sensor for sensing an emergency of the vehicle.

10. A seat belt mechanism according to claim 1, wherein said shoulder belt and said waist belt are reeled on a single reel shaft, one over the other.

11. A seat belt mechanism according to claim 1, wherein said press member and said stopper member are integrally formed.

12. A seat belt mechanism according to claim 1, wherein said press member is a shaft provided on an arm pivotally mounted on a casing of the retractor.

13. A seat belt mechanism according to claim 12, wherein said shaft mounts thereon a tubular member to which the one belt contacts.

14. A seat belt mechanism according to claim 12, wherein said stopper member is a friction member provided on said arm.

15. A seat belt mechanism according to claim 1, wherein said stopper member is disposed opposite to an abutment surface formed on a casing of the retractor along passage of the one belt so as to interpose the latter between said stopper member and the abutment surface, said stopper member being guided in guides formed in said casing in such a manner that the one belt is pressed onto said abutment surface to prevent drawing of said belt when the stopper member is moved in a direction corresponding to the drawing of said belt.

16. A seat belt mechanism according to claim 15, wherein said press member is a shaft provided on one end of an arm pivotally mounted on the retractor casing at the side of said belt the same as said abutment surface, a pressing portion formed on the other end of said arm pressing the belt onto said stopper member to permit the latter to move with the belt in the direction corresponding to the drawing of the belt to prevent movement of the belt when the arm is rotated by the drawing of the belt in opposition to the spring.

17. A seat belt mechanism according to claim 1, wherein said second through member is formed at a portion thereof with a slit through which said waist belt is inserted into and removed from said through member.

18. A seat belt mechanism according to claim 17, wherein said second through member is provided with a closure member for closing said slit.

19. A seat belt mechanism according to claim 17, wherein said second through member includes a ring member made of a wire and having said slit at a portion of the ring, and a support member for supporting said ring member in said guide.

20. A seat belt mechanism according to claim 19, wherein said ring member is fitted thereon with a tubular member for closing said slit.

21. A seat belt mechanism according to claim 1, wherein said belt hold member includes releasable means for releasing ends of said shoulder belt and said waist belt.

22. A seat belt mechanism according to claim 21, wherein said releasable means includes a closure member provided on said belt hold member to define an aperture through which a single continuous belt constituting said shoulder belt and said waist belt is inserted, said closure member being adapted to open and close said aperture to enable said continuous belt to be removed from said aperture.

23. A seat belt mechanism according to claim 22, wherein said closure member is a shaft member having one end pivotally supported on said belt hold member, said continuous belt inserted through said aperture contacting with said shaft member.

24. A seat belt mechanism according to claim 23, wherein said shaft member mounts thereon a tubular member with which said continuous belt contacts.

25. A seat belt mechanism according to claim 21, wherein said releasable means includes a tongue and a buckle to which said tongue is engageable, said shoulder belt and said waist belt being connected to either said tongue or said buckle while said belt hold member is provided with either said buckle or said tongue.

26. A seat belt mechanism according to claim 25, wherein said shoulder belt and said waist belt are constituted by a single continuous belt which is inserted through an aperture formed in either said tongue or said buckle.

27. A seat belt mechanism according to claim 26, wherein said continuous belt is frictionally inserted through said aperture.

28. A seat belt mechanism according to claim 1, wherein said first through member is provided in the vicinity of its connecting portion to said sash with a striker projecting in a direction of the width of the vehicle, a catch being provided on a pillar rearward of said door, said striker being positioned to overlap with respect to said catch in the direction of the vehicle width when said door is closed, so that said striker engages with said catch when said shoulder belt is strongly pulled forwardly and said sash is deformed.

29. A seat belt mechanism according to claim 28, wherein said striker is integrally formed with said first through member.

30. A seat belt mechanism according to claim 28, wherein said catch is in the form of a recess formed on the pillar.

31. A seat belt mechanism according to claim 30, wherein said recess is integrally formed with a panel constituting said pillar.

32. A seat belt mechanism according to claim 30, wherein a reinforcing member is fixed to said panel of the pillar around said recess.

33. A seat belt mechanism according to claim 1, wherein said first through member is attached to said sash through vertical position adjusting means to permit said first through member to be movable.

34. A seat belt mechanism according to claim 33, wherein said vertical position adjusting means includes a positioning member provided vertically on said sash and having a rugged surface, an engageable element provided on said first through member and engaging with said rugged surface to determine a vertical position of said first through member so as to normally engage said engageable element with said rugged surface.

35. A seat belt mechanism according to claim 33, wherein said first through member is provided in the vicinity of its connecting portion to said sash with a striker projecting in a direction of the width of the vehicle, a catch being provided on a pillar rearward of said door, said striker being positioned to overlap with respect to said catch in the direction of the vehicle width when said door is closed, so that said striker engages with said catch when said shoulder belt is strongly pulled forwardly and said sash is deformed.

36. A seat belt mechanism according to claim 35, wherein said striker is integrally formed with said first through member, said catch being provided over the entire range of vertical movement of the striker.

37. A seat belt mechanism according to claim 34, wherein said rugged surface on the positioning member is formed by serrated grooves.

38. A seat belt mechanism according to claim 37, wherein said engageable element is an engageable member of synthetic resin attached to said first through member and engageable with said serrated grooves on the positioning member provided on said sash, said engageable member having an integral spring section urging said engageable member onto said positioning member, said spring section constituting said resilient member.

39. A seat belt mechanism according to claim 33, wherein said vertical position adjusting means includes at least one pin fixed to said first through member, and a positioning member provided on said sash and having notches engaged by said pin.

40. A seat belt mechanism according to claim 33, wherein said vertical position adjusting means includes a plate provided on said sash, and a clip attached to said first through member and clamping said plate to determine a vertical position of said first through member.

41. A seat belt mechanism according to claim 1, wherein said first through member includes a base member attached to said sash, a support plate belt to hold said base member and pivotally attached thereto by a shaft member, and a through ring suspended by an inner surface of the bent portion of said support plate, said shoulder belt being inserted through said through ring.

42. A seat belt mechanism according to claim 41, wherein a cover of synthetic resin for covering an outer surface of said support plate is detachably detained on the latter through hook portions.

43. A seat belt mechanism comprising a first through member attached to a rearward and upper portion of a sash of a door of a vehicle, the forward edge of said door being pivotally supported by a vehicle body, a guide provided in the rearward portion of said door and extending vertically, a second through member guided in the guide, an actuator device for moving said second through member toward the lower portion of said guide when said door is closed and toward a position above said lower portion of said guide when the door is opened, a belt hold member fixed to either a seat adjacent to said door or so as to be positioned near to a center of the body, at least one retractor fixed to said door, a shoulder belt extending through said first through member and having one end adapted to be reeled into said retractor and the other end held by said belt hold member, and a waist belt extending through said second through member and having one end adapted to be reeled into said retractor and the other end held by said belt hold member;

said actuator device including a rack supported in said door so as to be slidable in a direction longitudinally of the rack and connected at one end to the vehicle body pivotally supporting said door, a pinion rotatably supported in said door so as to mesh with said rack, and interlocking means for interlocking said pinion and said second through member with each other, said second through member being moved by a relative displacement between said door and said rack due to opening an closing of said door;

said one end of the rack being pivotally connected to said vehicle body through linkage means; and said linkage means including a first link pivotally connected at one end to said rack, and a second link pivotally connected at one end to the other end of said first link and at the other end to said vehicle body, said first and second links being arranged such that the pivotal connection between said first and second links is guided along a link guide member to maintain an inflected condition of said links when said door is moved from a fully closed position to a predetermined partial open position, that said rack abuts on a stopper provided in said door to stop movement of the rack when said door reaches said predetermined partial open position, and that a relative displacement between said one end of the first link and said other end of the second link is permitted by alignment of said first and second links at said pivotal connection when said door is moved from said predetermined partial open position to a fully open position.

44. A seat belt mechanism according to claim 43, wherein said interlocking means includes a cable actuated by a drive wheel interlocked with said pinion through speed-up gears, said cable slidably received in a tube attached to said door and connected to said second through member.

45. A seat belt mechanism according to claim 44, wherein said second through member is moved upwardly along said guide when said cable is pulled by said drive wheel by opening of said door.

46. A seat belt mechanism according to claim 44, wherein said guide includes a tubular member fixed to an inner panel of said door and formed along a longitudinal axis of the tubular member with a slit opened toward a compartment of the vehicle, said cable being movable in said tubular member.

47. A seat belt mechanism according to claim 46, wherein said tubular member is disposed in a recess formed in said inner panel, edges of the tubular member defining said slit being extended and bent substantially parallel to said inner panel so as to press a trim member on a surface of said inner panel.

* * * * *